May 6, 1924.

C. H. MATTHIESSEN, JR 1,492,573

SLIDE VALVE FOR GAS ENGINES

Filed Jan. 28, 1921      4 Sheets-Sheet 1

May 6, 1924.
C. H. MATTHIESSEN, JR
SLIDE VALVE FOR GAS ENGINES
Filed Jan. 28, 1921
1,492,573
4 Sheets-Sheet 2
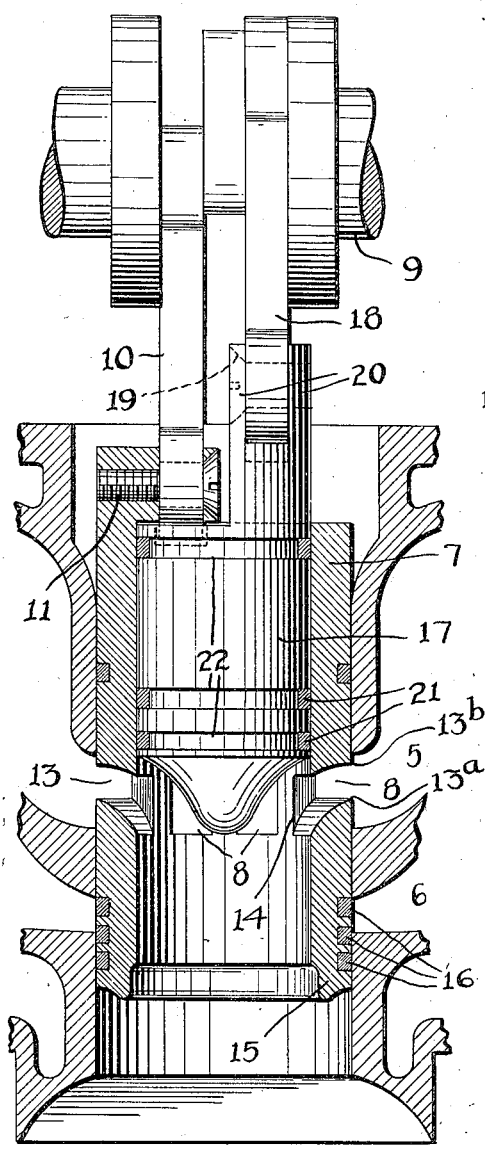
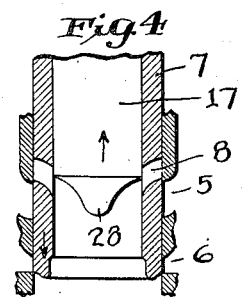
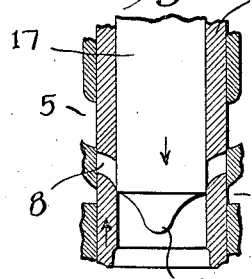
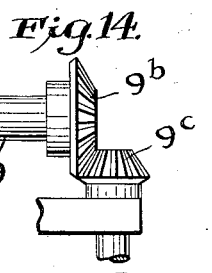
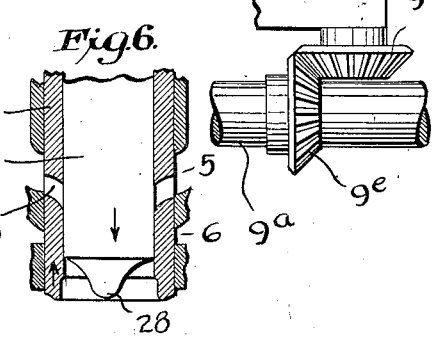
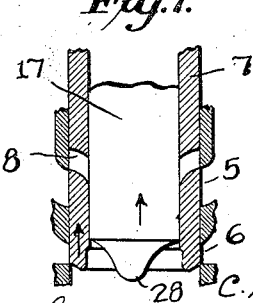
Inventor
C. H. Matthiessen Jr
By his Attorney

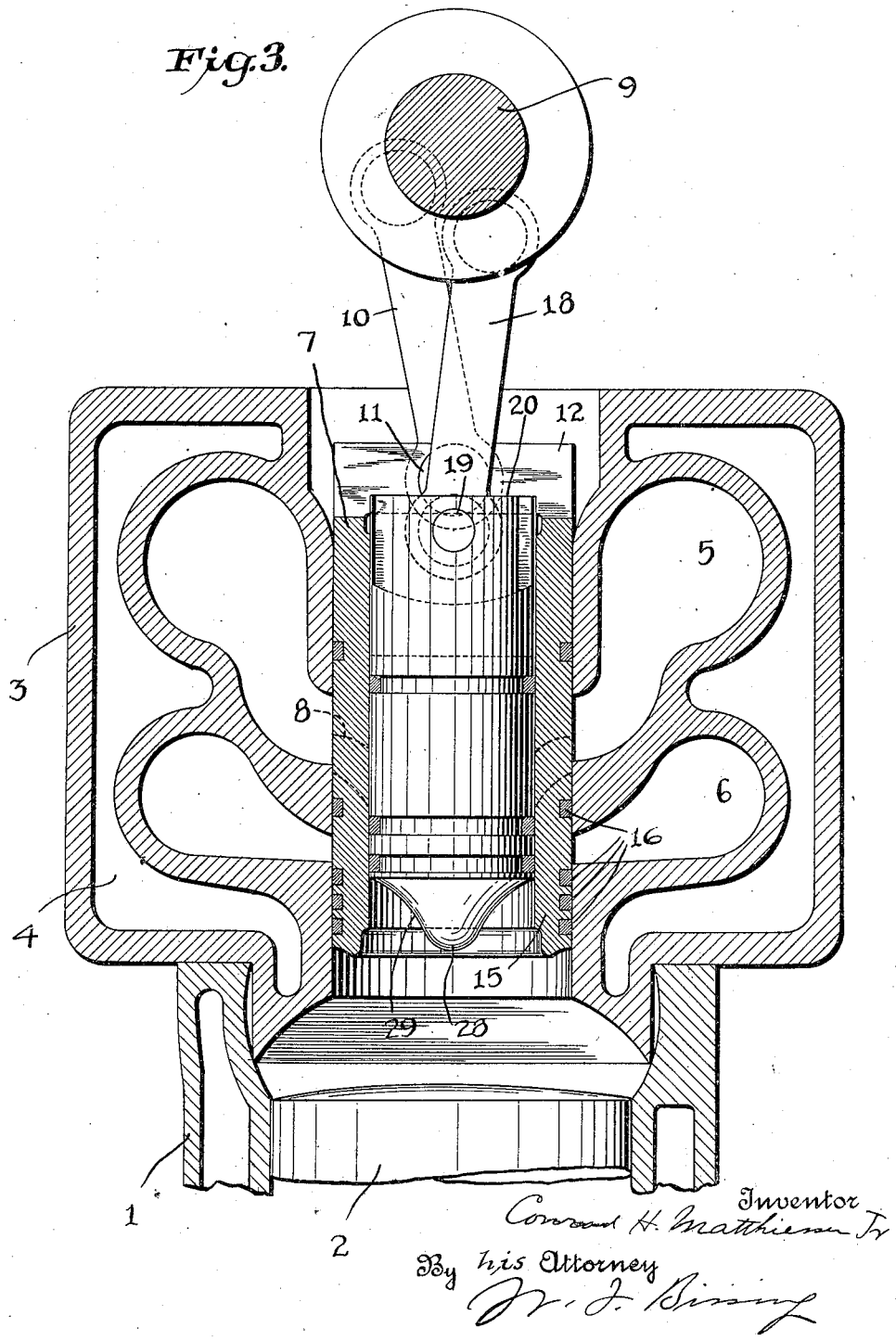

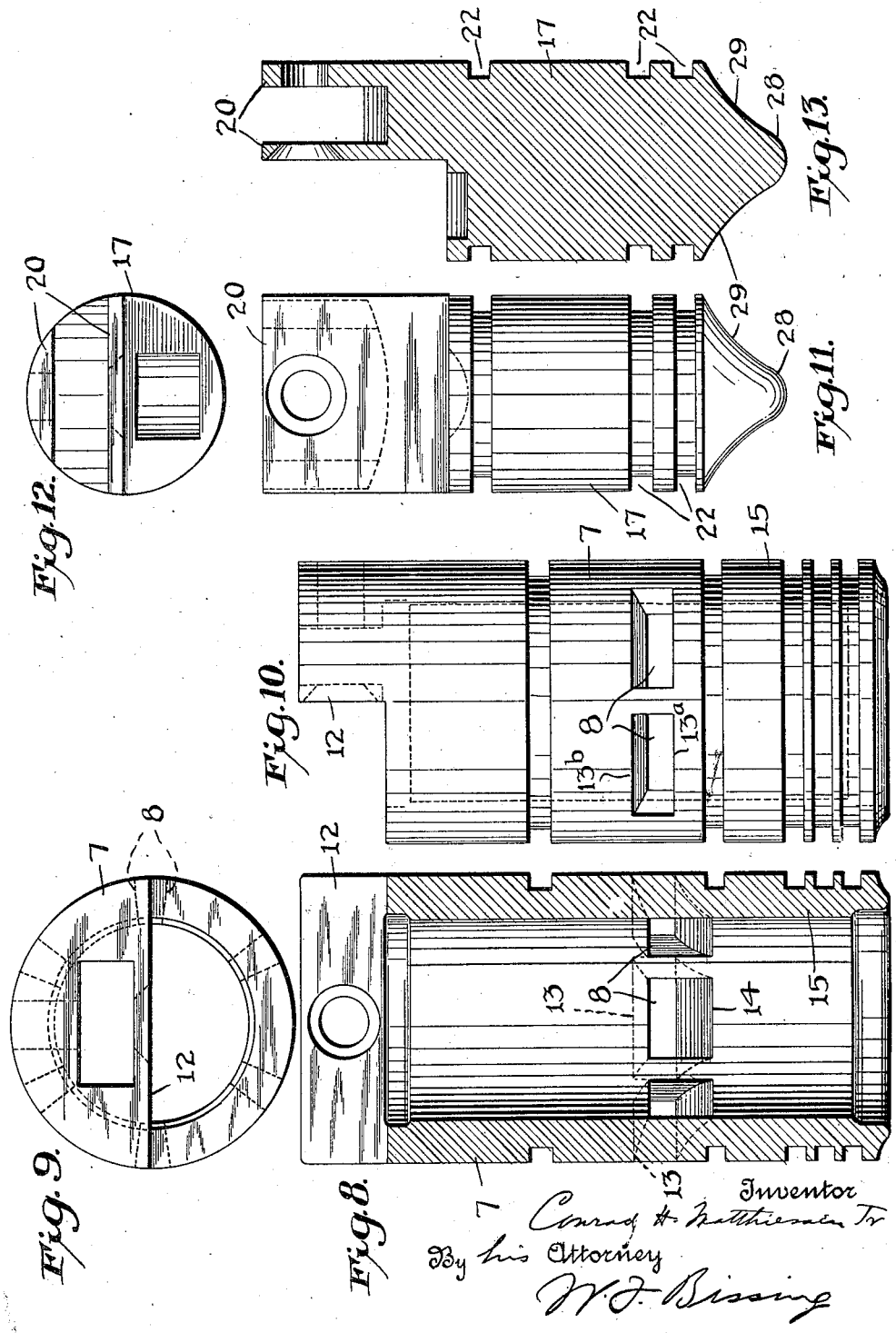

Patented May 6, 1924.

1,492,573

UNITED STATES PATENT OFFICE.

CONRAD H. MATTHIESSEN, JR., OF IRVINGTON, NEW YORK.

SLIDE VALVE FOR GAS ENGINES.

Application filed January 28, 1921. Serial No. 440,573.

*To all whom it may concern:*

Be it known that I, CONRAD H. MATTHIESSEN, Jr., a citizen of the United States, residing at Irvington, New York, have invented new and useful Improvements in Slide Valves for Gas Engines, of which the following is a specification.

My invention relates to a slide valve mechanism for internal combustion engines of the four cycle type.

One of the objects of my invention is to provide a single sleeve slide valve with a port which by itself opens, closes and controls the inlet or intake of the gases, the said sleeve also being provided with a skirt portion which controls the exhaust, a movable plug being used to block the inlet during the compression and firing strokes. The sleeve is mounted in a throat in a valve head of less diameter than the working cylinder.

Another object is to do away with the functioning of the movable plug inside the sleeve in controlling the inlet of the gases. In accordance with my invention, the movable plug within the sleeve does not control the inlet of the gases at and during the inlet stroke, for the inlet passage in the valve head is opened by the movement of the sleeve causing the inlet port to register with the inlet passage. There is thus provided a simple unitary slide valve, with quick opening and closing, large capacity, and a full opening for a long portion of the inlet stroke, the slide having a skirt to control the exhaust, the slide being driven by a simple form of valve driving and timing mechanism. The sleeve can be manufactured accurately, the plug not needing this accuracy of manufacture as the plug has nothing to do with the timing of the inlet. The ports are cast in the sleeve, the controlling edges of the mouth being accurately machined to position. As it is merely necessary to time the sleeve for the inlet control, this can be simply effected without having to conjointly time the plug. By providing the inlet port in the sleeve with a small mouth on the outside of the sleeve, whose height gradually increases to a wider discharge end, the motion of the mouth past a port in the head of larger area results in a quick opening and closing and a full opening of the inlet. The inlet port in the sleeve remains cool as it cooperates only with the inlet passage and not with the exhaust.

Other objects of the invention are to reduce the wall area of the sleeve exposed to the flame of the explosion and to help to attain and maintain a high degree of compression.

In accordance with my invention I so operate and time the plug that it will act during the compression and exhaust stroke to prevent the gases from being forced back thru the port in the sleeve into the intake passage and will act as a barrier to prevent improper suction thru the sleeve port when the adjacent cylinder is drawing in gas.

With the above and other objects in view my invention consists in the parts, improvements and combinations more fully pointed out hereinafter.

Referring now to the drawings, illustrating one form of the invention, Fig. 1 is a longitudinal section showing my improved valve mechanism with the sleeve about to begin the inlet stroke, the exhaust being closed.

Fig. 2 is a section taken at right angles to Fig. 1 showing the parts toward the middle of the inlet stroke, the exhaust being closed and the intake full open.

Fig. 3 is in the same plane as Fig. 1 showing the valve mechanism at the beginning of the firing stroke.

Figs. 4, 5, 6 and 7 illustrate somewhat diagrammatically the position of the parts at the beginning of the intake, the middle of the compression, the firing point and the beginning of the exhaust respectively.

Figs. 8 and 9 show a section and an end elevation of the sleeve.

Fig. 10 shows a side elevation of the sleeve.

Figs. 11 and 12 show a side elevation and a top view of the plug.

Fig. 13 shows the plug in section.

Fig. 14 shows the valve driving, speed reduction gearing.

Figure 1:
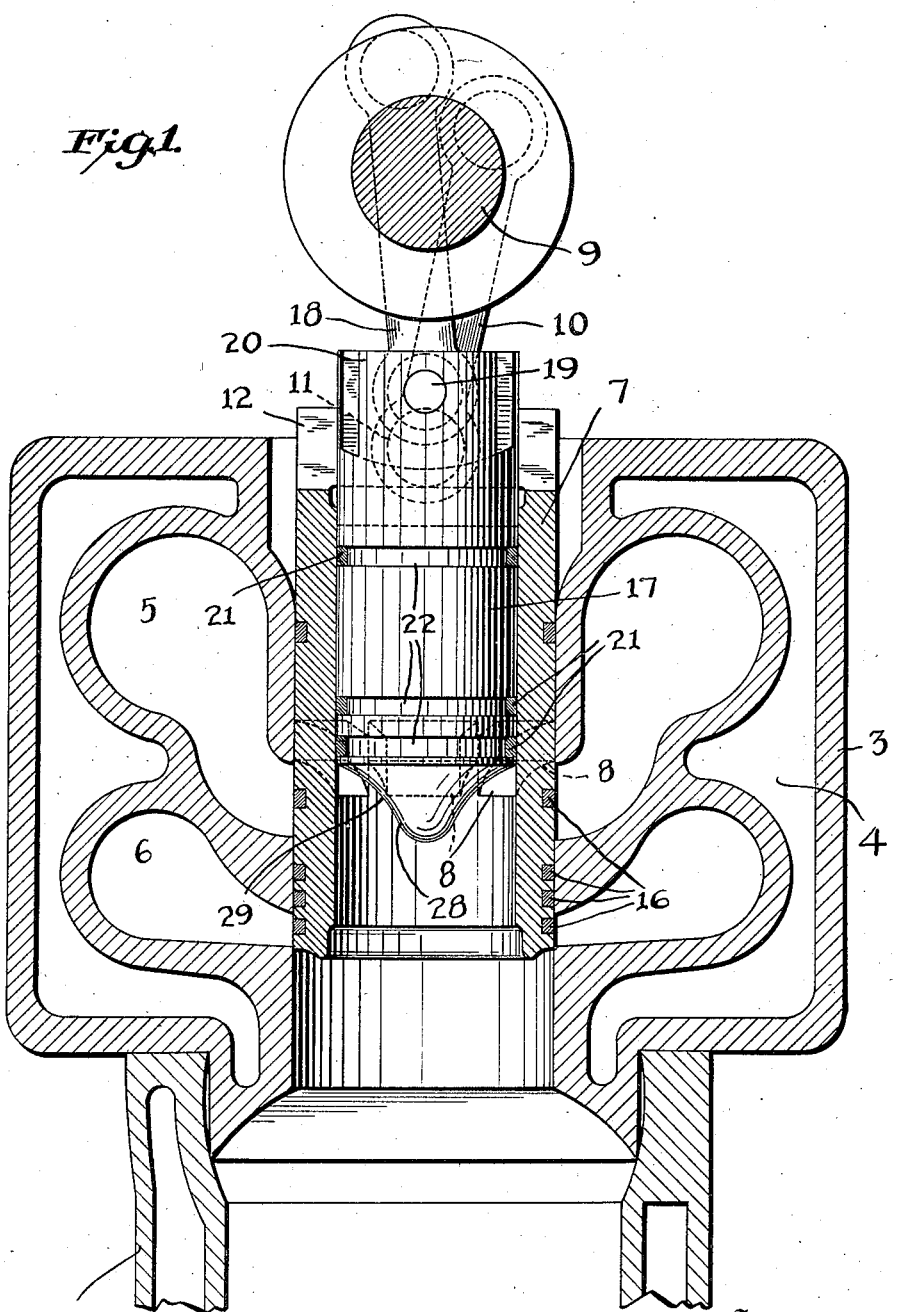

The valve is mounted at the top of the head of the cylinder 1, preferably in line with the axis of the cylinder, in a throat which is narrower than the bore of the cylinder, thus reducing the size of the parts. In Fig. 3 the working piston 2 is indicated at its top dead center position. A valve head 3 which may be water-cooled at 4 is bolted or otherwise secured to the cylinder head and is provided with an inlet passage 5 which may extend around the valve head and an exhaust passage 6.

In accordance with my invention I provide a single sleeve valve 7 with an inlet port 8, which may consist of one or more openings. Suitable means are provided for driving the sleeve. In the form of the invention illustrated the sleeve is driven from an overhead valve shaft 9 by a two to one speed reduction gearing from the main crank shaft $9^a$ of the engine, by gearing $9^b$, $9^c$, $9^d$, $9^e$. The sleeve is connected to the overhead shaft by suitable means such as a connecting rod 10.

As indicated, the connecting rod is secured to the sleeve by suitable means, for example by means of a pivot screw 11 passing thru an ear 12 projecting from the upper part of the sleeve. The sleeve is cut away at its upper part as shown in Fig. 10 so as to permit the end of the connecting rod for the plug to pass within the sleeve and bring the rod bearing nearly in line with the center of pressure.

One or more ports 8 are disposed about the sleeve. I prefer to make the inlet mouth 13 of the ports of substantially the same cross section but of narrower width lengthwise of the sleeve than their discharge ends 14. The inlet mouths can thus rapidly move into and out of registering relation with the inlet passages 5 securing a quick opening and closing and the gases will flow thru the ports readily. Their lips $13^a$ and $13^b$ respectively, open and close the inlet passage, by themselves. In accordance with my invention I make the width of the inlet mouth of the sleeve (measured in the direction of its length) and its cross-section less than the width and cross-section of the inlet passage. By this means the inlet mouth of the sleeve moves into and out of registering relation with the inlet passage in the valve head and remains in registering relation therewith for a substantial part of the stroke of the sleeve. This ensures a full opening of the inlet and a plentiful supply of gas during a large part of the inlet stroke.

The sleeve is provided with a skirt 15 which opens and closes the exhaust passage 6.

The inlet port 8 of the sleeve controls the inlet and does not move into registering relation with the exhaust passage, the exhaust passage being controlled by the skirt 15.

A plurality of rings 16 are used for securing a gas tight fit between the sleeve and the valve seat or throat in which the sleeve moves.

Turning now to the plug 17, this also is driven in the form of the invention illustrated, from the valve shaft 9. A connecting rod 18 connects the plug with the valve shaft, the connecting rod being pivotally secured to the plug, as for example by means of a screw 19 passing thru ears 20 in the top of the plug.

The plug is provided with rings 21 which are seated in grooves 22 of the plug.

It will be seen by an inspection of the Figures 1 to 7 that the plug is out of the way of the inlet port during the inlet stroke and that it acts during the compression and firing strokes to prevent the gases from being forced back from the combustion chamber of the engine thru the inlet port of the sleeve.

The valve shaft 9 is preferably driven from the main crank shaft $9^a$ of the engine as illustrated in Fig. 14 by means of the reduction gearing $9^b$, $9^c$, $9^d$ and $9^e$, so that the valve shaft makes one revolution for every two revolutions of the crank shaft.

In accordance with my invention I so construct the lower end of the plug 7 that it will act as a moving deflector for the incoming gases thruout the intake stroke and thus direct the incoming stream toward the combustion chamber and avoid the cross currents that might result from the different gas inlet ports in the sleeve directing the streams against each other causing eddies.

In the form of the invention illustrated the end of the plug is cone shaped as at 28 and the side walls 29 of the cone may be somewhat re-entrant so as to form a curve to guide the gases toward the axis of the cylinder.

From the above description the operation of the sleeve slide valve as applied to a four cycle internal combustion engine, will be clear. The operation of intake, compression, firing and exhaust is illustrated in the drawings, the sleeve with its port controlling the intake, its skirt controlling the exhaust, the plug being out of the way during the intake but acting as a barrier to the intake port in the sleeve during the compression and explosion stroke.

What I claim and desire to secure by Letters Patent is:

1. An internal combustion engine of the four cycle type, comprising a valve head, a single-sleeve slide valve reciprocating therein, a plug reciprocating within said slide valve, said valve provided with a port, in itself opening and closing the inlet passage in the valve head and with a skirt portion controlling the exhaust, and means for reciprocating said plug so that during the inlet stroke the plug is displaced from the port and is moved between the port and the explosion chamber during the compression and firing strokes, so as to block the inlet port when compressing and firing the charge.

2. In an internal combustion engine of the four cycle type, the combination of a valve head, a single-sleeve slide valve reciprocating therein, said valve provided with a port opening and closing the inlet passage in the valve head, and a skirt portion controlling the exhaust, a movable member within the sleeve, means for moving said member so that during the inlet stroke the member is displaced from said port, leaving the port opening free and is moved between the port opening and the explosion chamber, during the compression and firing stroke so as to block the inlet port.

3. In an internal combustion engine of the four cycle type, the combination of a valve head, a single-sleeve slide valve reciprocating therein, said valve provided with a port in itself opening and closing the inlet passage in the valve head, a skirt portion controlling the exhaust, and a plug reciprocating within the sleeve, said plug being provided with a deflector at its lower end for directing the incoming gases entering thru the port in the sleeve.

4. In an internal combustion engine of the four cycle type, the combination of a working cylinder, a valve head at the end of the cylinder with a throat extending in the direction of the axis of the cylinder, and provided with inlet and exhaust passages, the cross section of the throat being smaller than the cylinder, a sleeve slide valve reciprocating in said throat, said valve provided with a port whose lips open and close the inlet passage in the valve head, said valve having a skirt portion controlling the exhaust, a plug reciprocating within the sleeve, a valve shaft arranged beyond the valve head and connections between said shaft and the sleeve and plug respectively, the connections being such that the plug is displaced from the port in the valve during the inlet stroke, leaving the port in the valve, free during said stroke.

5. In an internal combustion engine of the four cycle type, the combination of a working cylinder, a valve head at the end of the cylinder with a throat extending in the direction of the axis of the cylinder and communicating with the cylinder bore, the cross section of the throat being smaller than the working cylinder bore, the throat being open at the far end, said valve head being provided with an inlet passage and an exhaust passage for communicating with said throat and a bridge separating said passages, a sleeve slide valve reciprocating in said throat provided with a port whose lips control the inlet passage in the valve head, said sleeve having a skirt portion controlling the exhaust, a plug reciprocating within the sleeve, a valve shaft arranged beyond the throat, connections between said shaft and said sleeve and plug, means for driving said valve shaft at half the speed of the main crank shaft of the engine, the parts being so constructed and arranged that the ported sleeve in itself controls the inlet passage, the plug being out of the way during the inlet stroke and moving between the sleeve port opening and the explosion chamber during the compression and firing strokes so as to block the inlet port.

6. In an internal combustion engine of the four cycle type the combination with the working cylinder of a valve head having a throat forming a longitudinal extension of the working cylinder, said valve head provided with inlet and exhaust passages separated from each other, the exhaust passage lying between the inlet passage and the combustion chamber of the working cylinder, of a slide valve reciprocating in said throat, said slide valve provided with a port whose lips respectively open and close the inlet passage in the valve head, said valve having a skirt portion controlling the exhaust, a cylindrical plug in the valve throat and means for reciprocating said plug.

7. A slide valve for internal combustion engines of the four cycle type, comprising a single sleeve provided with a port, said port having lips which control the inlet of the gases to the cylinder of the engine, said port being of substantially the same cross section throughout, but the mouth of the port being wider circumferentially than its discharge end, but narrower than the discharge end in the direction of its travel, a movable member within the sleeve, and means for moving said member thereby blocking the port in the sleeve during the compression and firing strokes.

8. An internal combustion engine of the four cycle type, comprising a valve head forming an axial extension of the engine cylinder, a tubular sleeve slide valve reciprocating therein, said valve provided with a plurality of transverse ports whose lips open and close the inlet passage in the valve head, said valve having a skirt portion controlling the exhaust and a movable member within the sleeve for blocking the port in the sleeve during the compression and firing strokes.

9. In an internal combustion engine of the four cycle type, the combination of a valve head, a sleeve slide valve reciprocating therein, said valve provided with a port controlling the inlet passage in the valve head, and a skirt portion controlling the exhaust, the width of the port in the slide valve, measured in the direction of its length, being less than the width of the inlet passage in the valve head, a movable plug within the sleeve, means for moving said plug so that during the inlet stroke the plug is displaced from said port, leaving the port opening free and is moved between the port opening and the explosion chamber, during the compression and firing stroke so as to block the inlet port.

10. In an internal combustion engine of the four cycle type the combination with the working cylinder of a valve head having a throat forming a longitudinal extension of the working cylinder, said throat being of smaller diameter than the cylinder bore, said valve head provided with inlet and exhaust passages separated from each other, the exhaust passage lying between the inlet passage and the combustion chamber of the working cylinder, of a slide valve reciprocating in said throat, said slide valve provided with a port whose lips respectively open and close the inlet passage in the valve head, said valve having a skirt portion controlling the exhaust, a reciprocating member closing the throat and means for reciprocating said member.

11. A slide valve for internal combustion engines of the four cycle type, comprising a sleeve provided with a port, said port having lips which in themselves control the inlet of the gases to the cylinder of the engine, said port being of substantially the same cross section thruout, but the mouth of the port being wider circumferentially than its discharge end but narrower than the discharge end in the direction of its travel, the width of the port in the slide valve, measured in the direction of its length being less than the width of the inlet passage in the valve head, a cylindrical plug within the sleeve and means for reciprocating said plug.

12. An internal combustion engine of the four cycle type, comprising a valve head, a sleeve slide valve reciprocating therein, said valve provided with a port, in itself controlling the inlet passage in the valve head and with a skirt portion controlling the exhaust, the width of the port in the slide valve, measured in the direction of its length, being less than the width of the inlet passage in the valve head, a cylindrical member within the sleeve valve and means for reciprocating said member.

13. In an internal combustion engine of the four cycle type, the combination of a valve head extending in line with the axis of the cylinder, a single-sleeve slide valve reciprocating therein, said valve provided with a port controlling the inlet passage in the valve head, and a skirt portion controlling the exhaust, a movable member sliding adjacent to said sleeve means for moving said member so that during the inlet stroke the member is displaced from said port, leaving the port opening free and is moved between the inlet passage and the explosion chamber, during the compression and firing stroke so as to block the inlet port.

14. An internal combustion engine of the four cycle type, comprising a valve chamber extending in line with the engine cylinder, a curved slide valve reciprocating therein, means for reciprocating said valve, said valve provided with a port whose lips in themselves open and close the inlet passage in the valve chamber, said valve having a skirt portion controlling the exhaust, said sleeve carrying a plurality of rings for sealing the space between the sleeve and the valve chamber, a curved plug carrying sealing rings closing said valve chamber and means for reciprocating said plug.

15. An internal combustion engine of the four cycle type, comprising a valve chamber, a curved slide valve reciprocating therein, means for reciprocating said valve, said valve provided with a port whose lips in themselves open and close the inlet passage in the valve chamber, said valve having a skirt portion controlling the exhaust and means other than the valve for blocking the inlet passage during the compressing and firing strokes of the engine.

16. An internal combustion engine of the four cycle type, comprising a valve chamber extending in line with the engine cylinder, a curved slide valve reciprocating therein, means for reciprocating said valve, said valve provided with a port whose lips in themselves open and close the inlet passage in the valve chamber, said valve having a skirt portion controlling the exhaust a movable member, means for moving said member so that during the inlet stroke the member leaves the inlet passage open and is moved so as to block the inlet passage during the compression and firing strokes.

17. In an internal combustion engine of the four cycle type, the combination of a valve head extending in line with the engine cylinder, said valve head provided with an inlet port, a sleeve slide valve reciprocating therein, said valve provided with a port for controlling the inlet port in the valve head, and a skirt portion controlling the exhaust, the width of one of said ports measured in the direction of its length being less than the width of the other of said ports, a movable plug within the sleeve, means for moving said plug so that during the inlet stroke the plug is displaced from said sleeve port, leaving the sleeve port opening free and is moved between the sleeve port opening and the explosion chamber, during the compression and firing stroke so as to block the inlet port.

In testimony whereof, I have signed my name to this specification, in the presence of a subscribing witness.

C. H. MATTHIESSEN, Jr.

Witness:
   LOUELLA F. LITTLE.